INVENTOR.
JAMES T. COGHILL

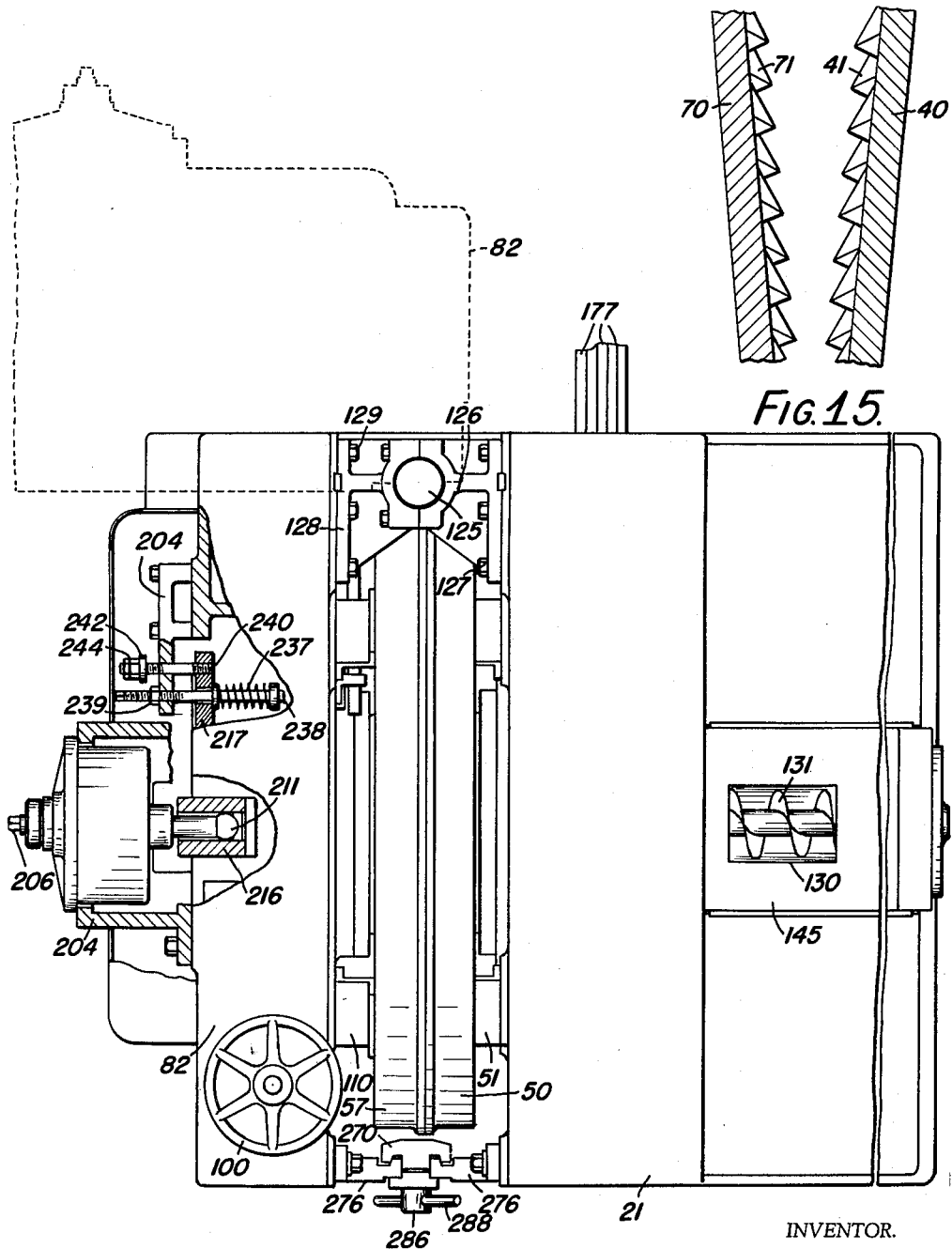

April 10, 1962 J. T. COGHILL 3,028,632
MACHINE FOR TREATING WOOD PULP AND THE LIKE
Filed Nov. 18, 1957 10 Sheets-Sheet 3

INVENTOR.
JAMES T. COGHILL
BY
ATTORNEY

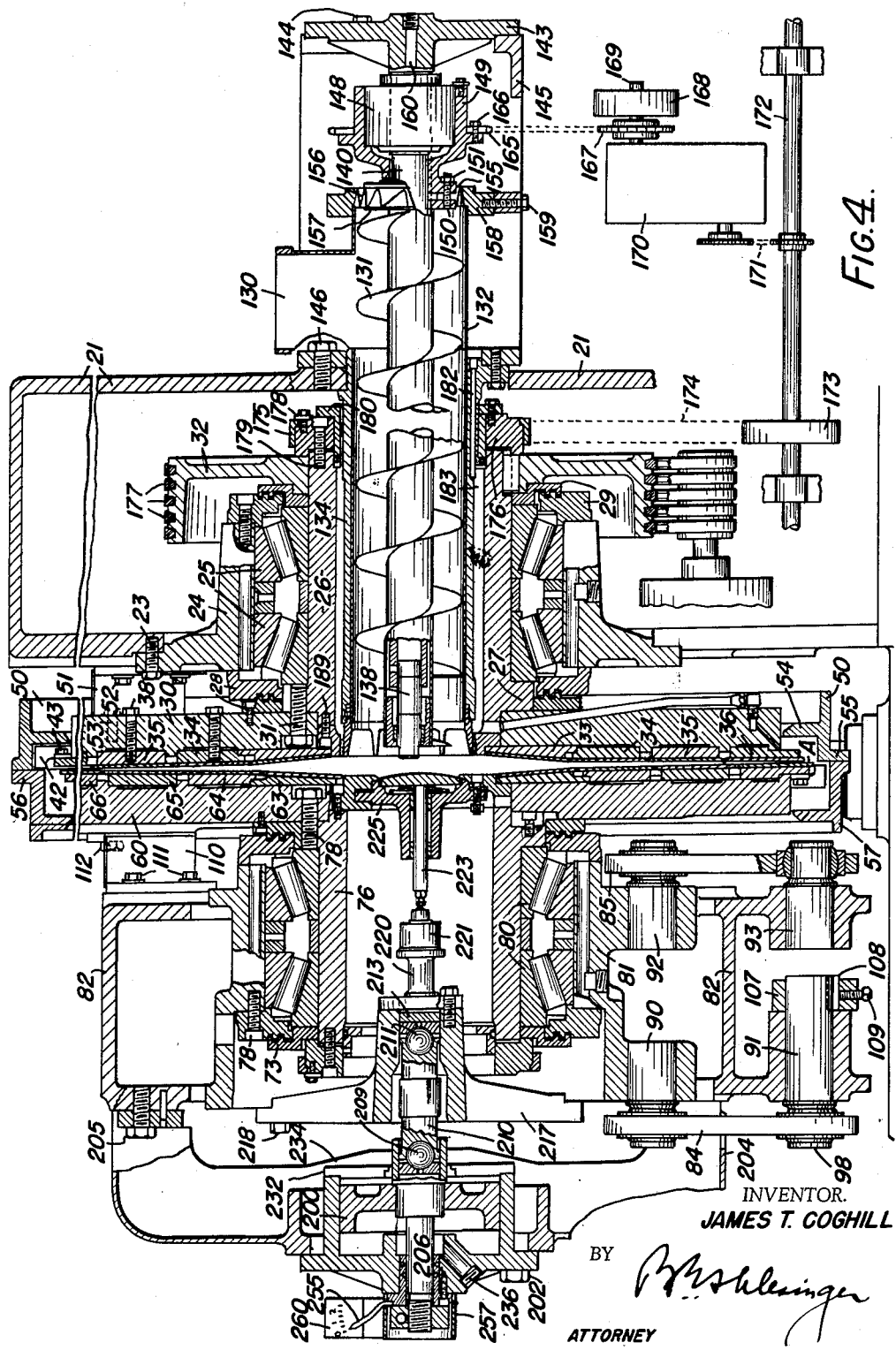

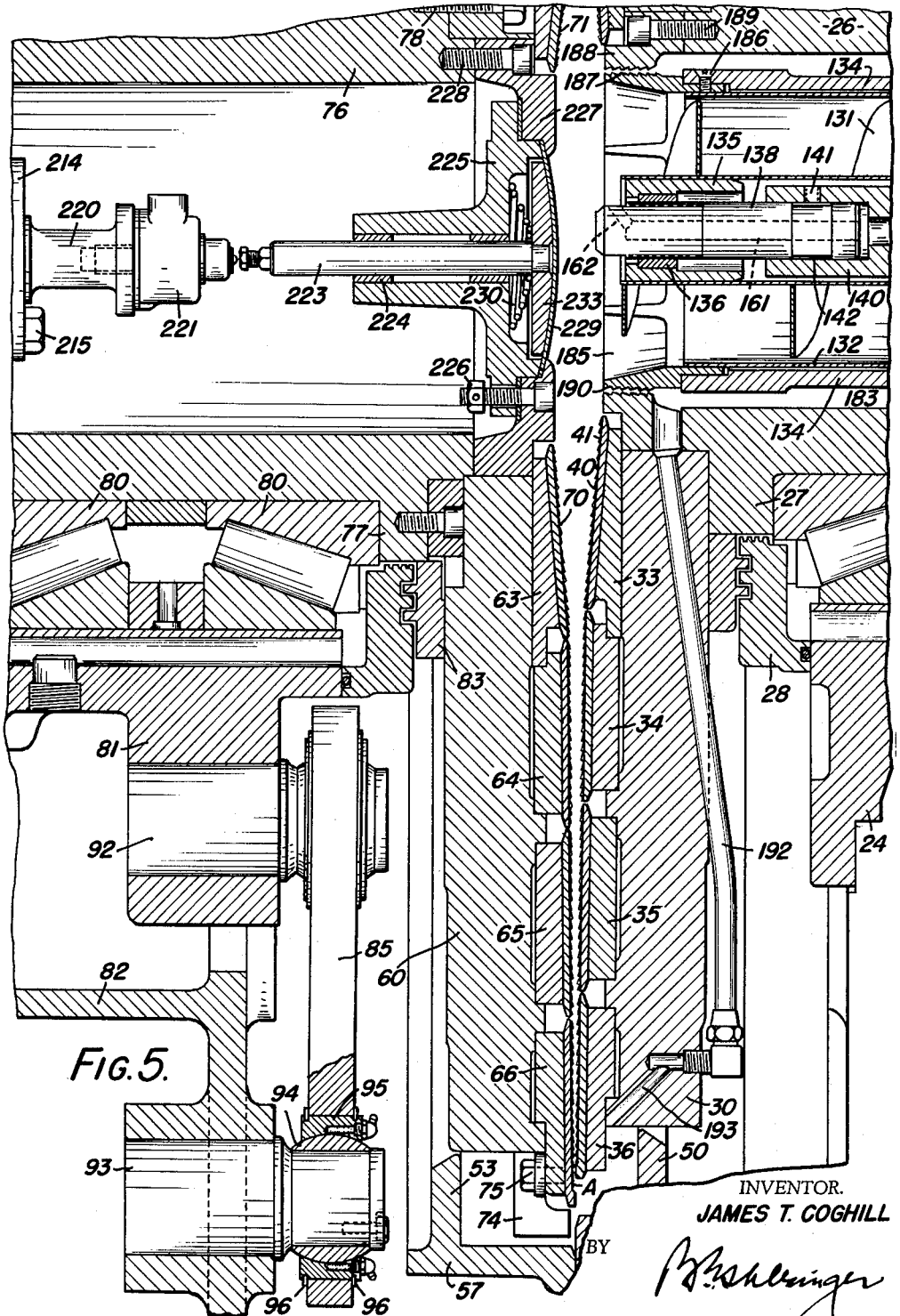

April 10, 1962 J. T. COGHILL 3,028,632
MACHINE FOR TREATING WOOD PULP AND THE LIKE
Filed Nov. 18, 1957 10 Sheets-Sheet 6

INVENTOR.
JAMES T. COGHILL
BY
ATTORNEY

April 10, 1962  J. T. COGHILL  3,028,632
MACHINE FOR TREATING WOOD PULP AND THE LIKE
Filed Nov. 18, 1957  10 Sheets-Sheet 7

INVENTOR.
JAMES T. COGHILL
BY
ATTORNEY

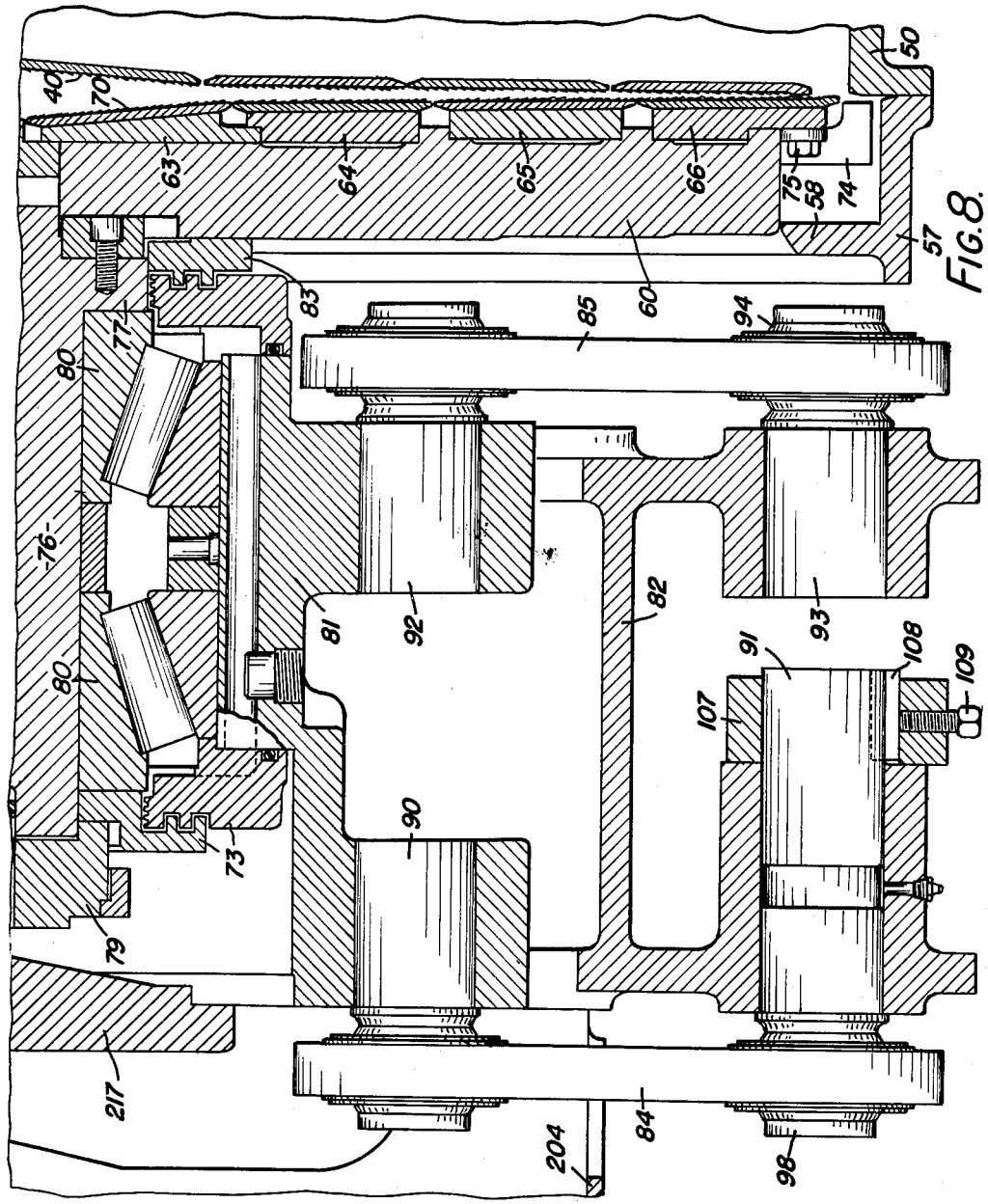

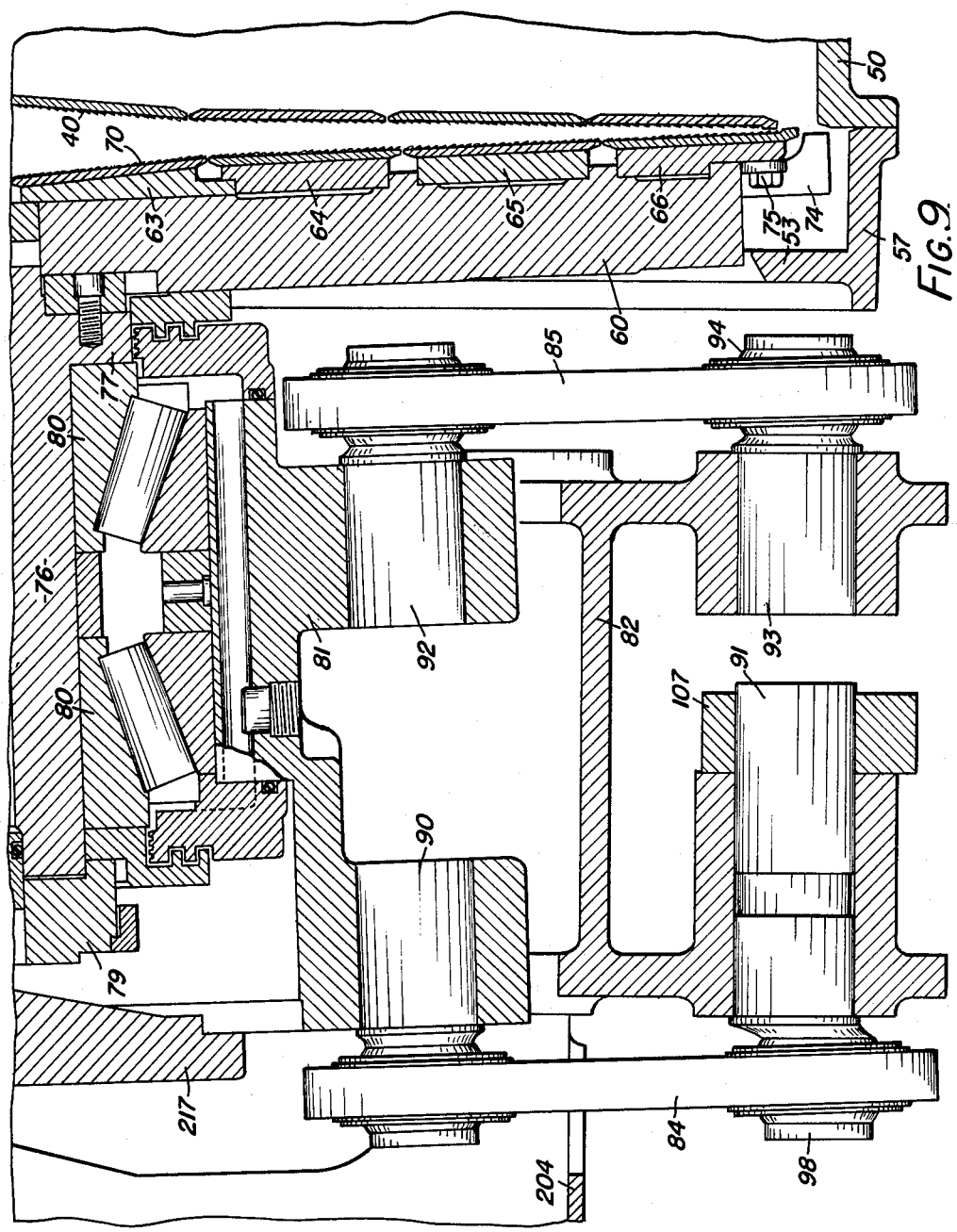

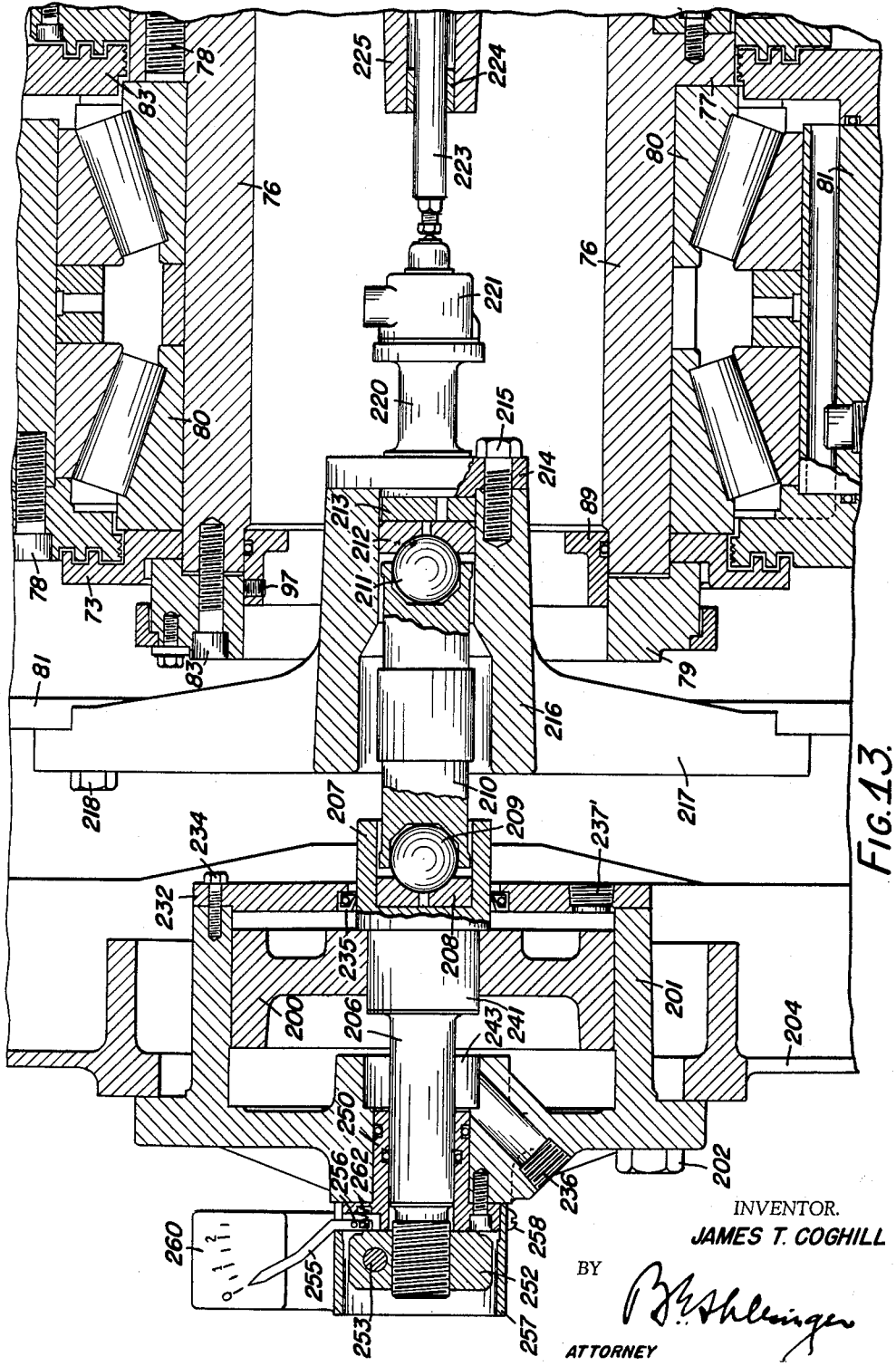

United States Patent Office 3,028,632
Patented Apr. 10, 1962

3,028,632
MACHINE FOR TREATING WOOD PULP
AND THE LIKE
James T. Coghill, Pittsford, N.Y., assignor to Curlator
Corporation, East Rochester, N.Y., a corporation of
Delaware
Filed Nov. 18, 1957, Ser. No. 697,166
16 Claims. (Cl. 19—66)

The present invention relates to machines for processing fibrous material and particularly to machines for processing wood pulp for making paper. In a more specific aspect, the invention relates to machines for mechanically processing wood pulp according to the method disclosed in the Hill and Edwards Patent No. 2,516,384, granted July 25, 1950.

In the process of Patent No. 2,516,384, the pulp, which is to be treated, is rolled traversingly in different directions in tractive contact with and under compression between two opposed working surfaces that are knurled to provide the required traction. The pulp may be previously nodulated, but, if not, it will be formed, as it rolls between and over the working surfaces under compression, into nodules in which the fibers of the pulp are intertwined and curled on one another. As the nodulated pulp is rolled traversingly under compression between and over the working surfaces, the nodules of the pulp will be formed into rotatable units and these units will be caused to travel rollwise under compression, thereby causing continuous reorientation of the nodules relative to the direction of applied pressure. Thus, the pulp fibers or fiber bundles will be bent, and twisted, and subjected to increased contortion as the units of nodules roll traversingly over the working surfaces. This causes separation or liberation of the fibers which may be bonded together, without mutilating the fiber structure or forming fiber debris. Thus, the method of Patent No. 2,516,384 provides an effective means of eliminating the small, but undesirable, shive content of regular commercial grades of pulp, such as sulphite, kraft, and soda pulp. Moreover, it supplies a much-needed step in the production of so-called high-yield or semi-chemical pulps, all of which require reduction of fiber bundles while retaining high freeness in order to facilitate further processing and form a clean sheet of paper. The method of Patent No. 2,516,-384 unbonds or liberates the individual fibers to an essentially complete degree with a very low expenditure of power and without sacrifice of freeness.

In the machines, which have been built heretofore for practicing the invention of Patent No. 2,516,384, one of the working surfaces has been stationary; and the rolling of the pulp traversingly between the working surfaces has been achieved by imparting a gyratory or orbital motion to the other working surface. Moreover, these machines have been of the vertical type, that is, one working surface has been superimposed above the other, and the gyratory motion has been effected about a vertical axis. In these prior machines, furthermore, control of the speed of the rolling feed of the stock across the working surfaces has depended largely upon the angles of the teeth or protrusions on the opposed knurled working surfaces. With these prior machines, also, it has been extremely difficult to process chippy material.

The present invention has for one object the provision of a simple and compact but fast, thorough and efficient machine for carrying out the process of Patent No. 2,516,384.

Another object of the invention is to provide a machine of the character described which will lend itself better to incorporation in a line of equipment for processing pulp than the vertical type machines heretofore employed for practicing the process of Patent No. 2,516,384.

Another object of the invention is to provide a machine of the character described which can process chippy material readily.

A further object of the invention is to provide a machine of the character described in which centrifugal force is invoked as an aid in inducing radial traverse of the pulp outwardly across the working surfaces.

A still further object of the invention is to provide a machine for the character described having a quick release for purging foreign material from between the working surfaces.

Still another object of the invention is to provide a machine of the character described which will have fewer parts, be of less weight, and be of reduced cost as compared with machines heretofore built for practicing the process of Patent No. 2,516,384.

Other objects of the invention will be apparent hereinafter from the specification and from the recital of the appended claims, when taken in conjunction with the accompanying drawings.

In the drawings:

FIG. 2 is a plan view of this machine, parts being broken away for illustration, the frame, which carries the floating housing of the machine, being shown in full lines in operative position and being shown fragmentarily in dotted lines swung away from the frame on which the driving plate is mounted;

FIG. 4 is a central, vertical longitudinal section through the machine on a somewhat enlarged scale, parts being broken away in order to illustrate the machine within the confines of the space limitations of the drawing;

FIG. 5 is a similar section on a still further enlarged scale, showing a portion only of the parts illustrated in FIG. 4;

FIG. 8 is a fragmentary longitudinal vertical sectional view on a considerably enlarged scale, further illustrating the mounting of the floating housing, and showing this housing in zero position of one of its tilting adjustments;

FIG. 9 is a similar view, but showing the housing tilted in a vertical plane in order to achieve control of the rate of speed of traversing feed or roll of the pulp between and over the working surfaces;

FIG. 13 is a fragmentary longitudinal, vertical sectional view on an enlarged scale showing particularly the means for applying the working load to the pulp during the curling operation;

FIG. 15 is a fragmentary sectional view on an enlarged scale illustrating the character of the working surfaces of the machine.

In the machine of the present invention both working surfaces rotate; however, only one, that attached to the herein called driving plate, is driven positively. The other, that attached to the herein called floating plate, rotates because the pulp between the working surfaces acts to transmit the motion of the driving plate to the floating plate. Both working surfaces, therefore, rotate in the same direction. The axes of the two working surfaces are offset from one another so as to achieve a relative gyratory or orbital motion of the working surfaces, thereby to effect the curling roll of the pulp between the working surfaces.

Control of the rotational speed of the floating plate is attained by tilting one plate relative to the other. In the machine illustrated, this is effected by tilting adjustment in a vertical plane. The machine also has a tilting adjustment in a horizontal plane. The purpose of this latter tilt is to achieve uniformity of pressure in that plane.

To supply the required pressure on the pulp, the floating plate is urged toward the driving plate by fluid pressure on the outer face of a piston which is connected to the floating plate. To purge foreign material from between the plates, the fluid pressure is released; spring pressure, which constantly opposes the fluid pressure, is then operative to move the floating plate instantaneously away from the driving plate, to dump the stock from between the plates.

In the machine illustrated, the axes of the two working surfaces are approximately horizontal. This construction, it has been found, lends itself better to incorporation of the machine in a line of equipment for treating pulp to manufacture paper.

The machine illustrated is built so that it can be opened up to permit ready access to the working surfaces. For this purpose, the driving and floating ends of the machine are hinged together by a vertically disposed hinge-pin. During operation the two parts of the machine are clamped together, and casings enclose the whole working area. To permit access to the working area, however, the clamping means is released, and the floating housing is swung away from the housing of the driving plate and its related parts.

Figure 1:
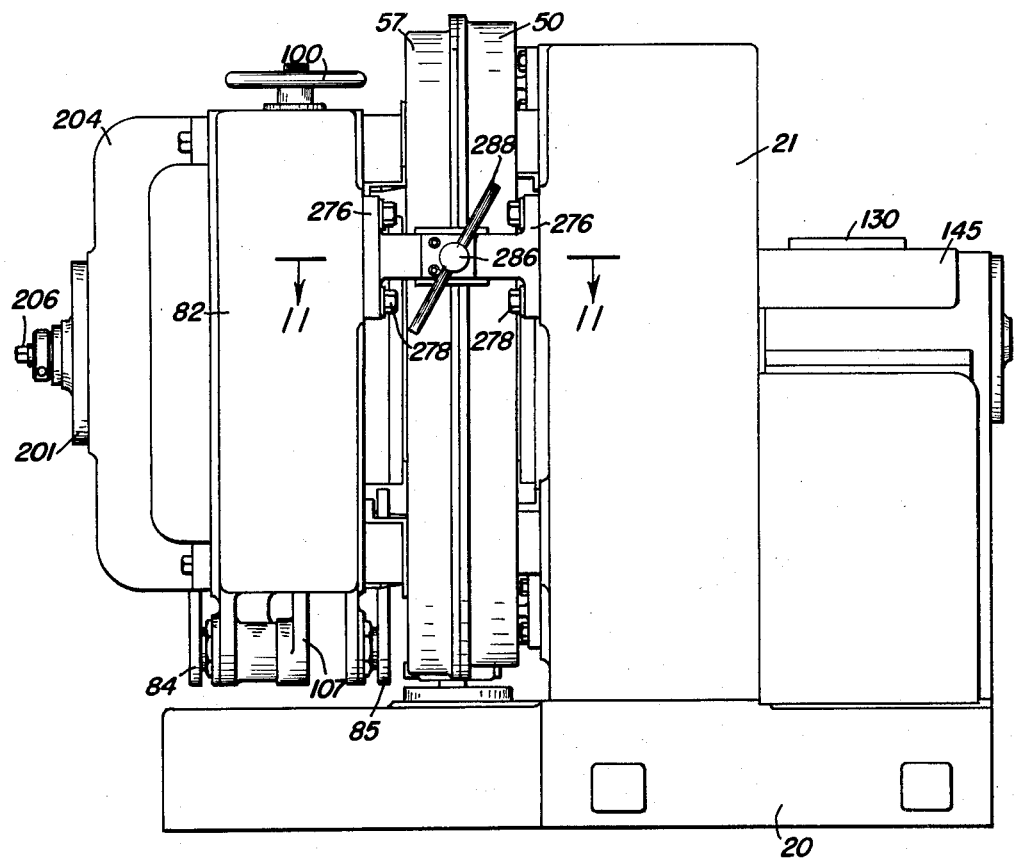
FIG. 1 is a side elevation of a machine built according to one embodiment of this invention.

Referring now to the drawings by numerals of reference, 20 (FIG. 1) denotes the base of the machine. Upon this is mounted the frame 21. Secured in the frame 21 by means of a plurality of bolts 23 is an annular bracket 24 (FIG. 4). Journaled in this bracket on a conventional double row, opposed tapered roller bearing 25 is a sleeve 26.

The sleeve 26 is formed at its front end with a flange 27, to which there is secured a driving plate 30 by means of bolts 31. Interposed between the driving plate 30 and the bracket 24, to surround the flange 27 and protect the front end of the anti-friction bearing 25, is a conventional labyrinth seal 28 (FIGS. 4 and 5) in the form of two internested members, one of which is secured to the back face of plate 30 and the other of which is secured to the front face of the bracket 24. Another conventional labyrinth seal 29 protects the bearing 25 at its rear. One of the internested members of the bearing is secured to the rear face of the bracket 24 and the other member is secured to the front face of a pulley 32 which is keyed to the sleeve 26.

Fastened to the front face of the plate 30 are a plurality of concentric rings 33, 34, 35 and 36, which are secured to the plate 30 by bolts 38. Welded, or otherwise secured to the front faces of the rings 33, 34, 35 and 36 are the working plates 40 (FIG. 5) which are formed on their front faces with knurled working surfaces. These working surfaces may be such as disclosed in my U.S. Patents Nos. 2,646,728 and 2,674,928, granted July 28, 1953, and April 13, 1954, respectively, being provided with projections or protuberances 41 (FIG. 15). Together the plates 40 constitute one working surface of the machine.

The front face of the ring 33 (FIGS. 4 and 5) is preferably formed as an internal conical surface so that it is dished toward the axis of the sleeve 26. The front faces of the rings 34, 35 and 36 may be internal conical surfaces; but preferably these are of increasing cone angle so that they are of progressively decreasing inclination to a plane perpendicular to the axis of the sleeve 26. In fact, the front faces of the rings 35 and 36 may lie in such a plane, if desired.

Secured to the outermost ring 36 at angularly spaced points around its periphery, to project radially beyond the outermost working plates 40, are a plurality of paddles or flingers 42. Only one of these paddles or flingers is shown in FIG. 4. This is at the top of this figure. The paddles or flingers are fastened to the ring 36 by bolts 43.

A ring-shaped casing 50 surrounds the plate 30 and the working plates 40 mounted thereon. It is suspended from the frame 21 by four Z-shaped brackets 51 which are secured to the frame 21 by bolts 52 which are secured to the casing 50 by bolts 53. The Z-brackets so suspend the casing 50 that expansion or contraction of the casing can take place without warping.

The ring-shaped casing 50 (FIGS. 4 and 12) has a central radially-projecting rib 54 for strength. This rib also acts, in effect, as a sealing means. With the plate 30 rotating at a speed of 6000 ft. per min., the paddles or flingers 42 act to pull air in between the periphery of the plate 30 and the rib 54 to effectively prevent stock leakage at this point. A flange 55 at the front of the casing is adapted to abut against a corresponding flange 56 in a companion casing 57, that surrounds the other working surface of the machine, thereby to enclose the whole working area of the machine.

Figure 16:
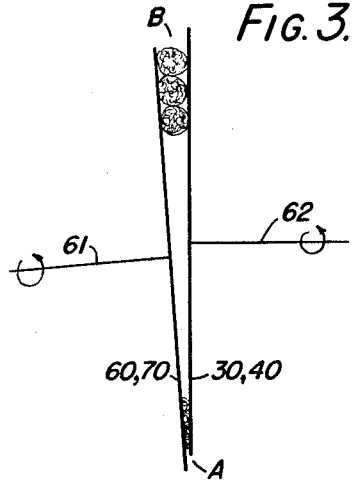
FIG. 16 is a diagrammatic view showing how the working surfaces are tilted relative to one another to achieve control of the speed of the floating plate relative to that of the driven plate.
Figure 6:
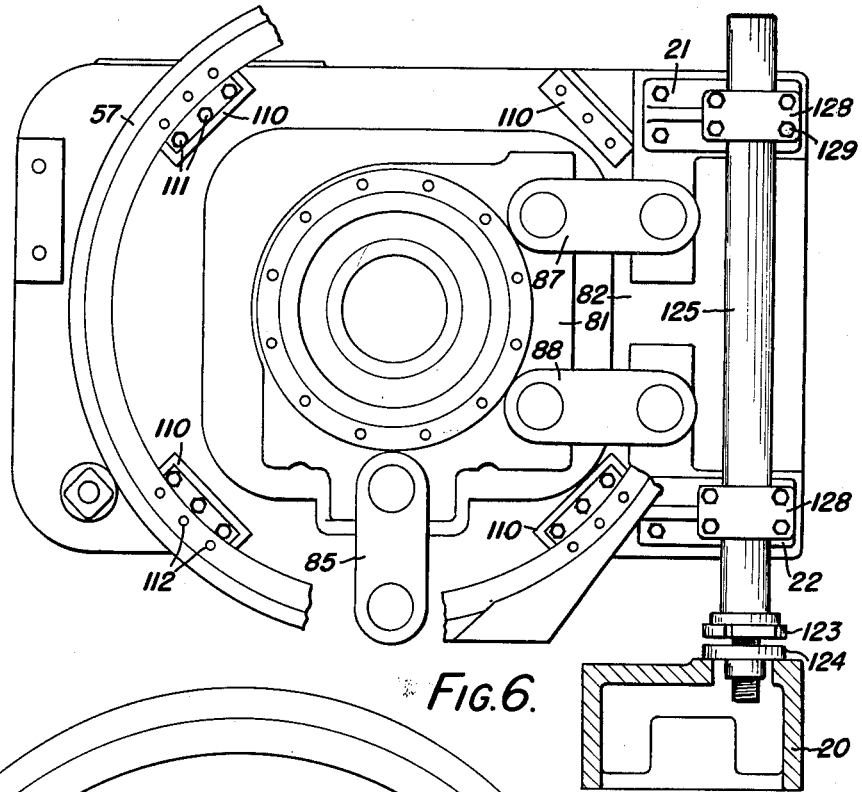
FIG. 6 is a fragmentary view looking at the front end of the floating housing of the machine, the driven plate being removed and part of the casing, which encloses this plate, being broken away, in order better to illustrate the mounting of the floating housing.

The casing 57 surrounds a floating plate 60 (FIGS. 4 and 5), generally similar to the plate 30 but mounted so that its axis 61 (FIG. 16) is offset from the axis 62 of the plate 30. Plate 60 has a plurality of rings 63, 64, 65, and 66 (FIGS. 4 and 5) secured to it by bolts (not shown) in the same general way as the rings 33, 34, 35 and 36 are secured to the plate 30. Working plates 70, similar to the working plates 40, are welded or otherwise secured to the rings 63, 64, 65 and 66. The plates 70 have protuberances or projections 71 (FIG. 15).

The front face of the ring 63 (FIGS. 4 and 5) is internally conical, that is, it is dished toward the axis of the plate 60 at a considerable angle; and the front faces of the other rings 64, 65 and 66 may be slightly dished, also. To the outermost ring 66 there is secured a plurality of angularly-spaced paddles or flingers 74 by means of bolts 75.

The working plates 70 confront the working plates 40 and form with the working plates 40 the working area of the machine. The plates 40, which are secured to the ring 33, and the confronting plates 70, which are secured to the ring 63, diverge most from each other, forming a relatively wide space into which the pulp enters the working area. The confronting plates attached to the other pairs of rings 34 and 64, 35 and 65, 36 and 66 have progressively reduced clearance relative to one another so that the depth of the working space is progressively decreased until it is at a minimum at the peripheries of the two working surfaces, which is the discharge zone of the machine. The pulp is rolled between the working surfaces in the operation of the machine to perform the process of Patent No. 2,516,384. Sleeve member 76 is journaled by means of a pair of conventional opposed taper roller bearings 80 in a floating housing 81 (FIGS. 4, 5, 6 and 7).

A conventional labyrinth seal 83, which surrounds the flange 77 of sleeve member 76, protects the bearing 80 at its front end. One member of this seal is secured to the rear face of plate 60, and the other member of this seal is secured to the front face of the floating housing 81. A similar labyrinth seal 73 surrounds the rear end of the sleeve member 76 to guard the bearing 80 at its rear end. One member of this seal is secured by bolts 78 to the floating housing 81 and the other member of this seal is secured in place by a clamping ring 79 which is fastened to the rear face of the sleeve member 76 by screws 83 (FIG. 13). A sealing ring 89 seats within the bore of ring 79 and the adjacent part of the bore of sleeve member 76. It is held in place in the clamping ring 79 by set-screw 97.

Housing 81 is supported in a frame 82 by means of five links 84, 85, 86, 87 and 88 (FIGS. 3, 4, 5, 7, 8 and 9). The links 84 and 85 cooperate in controlling the tilt of the plate 60 in a vertical plane. The links 86, 87 and 88 cooperate in controlling the tilt of the plate 60 in a horizontal plane.

The links 84 and 85 are generally parallel to one another, and are mounted, respectively, at the rear and at the front of the floating housing 81. The link 84 is mounted at opposite ends on studs or axles 90 and 91 (FIGS. 8 and 9), respectively. The link 85 is mounted at opposite ends on studs or axles 92 and 93, respectively. Each link is mounted on each of its studs by means of a stainless steel anchor ring 94 (FIG. 5) having a convex spherical outside surface and constituting, in effect, a ball head for the stud. Each anchor ring is received inside a bronze ring 95 which has a concave spherical bore fitting the outside surface of the anchor ring 94. Snap rings 96 serve to secure each bronze ring 95 in place.

Figure 10:
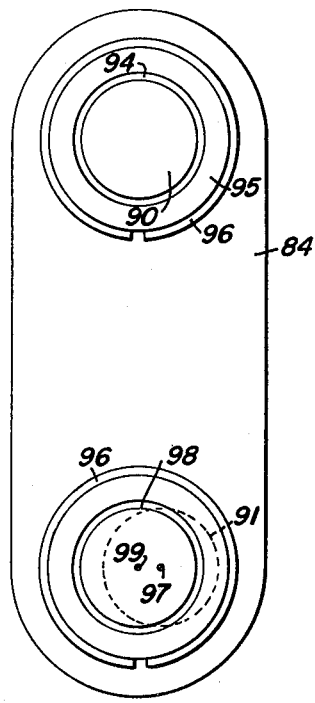
FIG. 10 is an end elevation showing the adjustable link which controls the vertical tilt of the driven working surface.

The studs or axles 90, 92 and 93 are alike. Their heads are coaxial with the axis of the axle itself. The stud or axle 91, however, has its head 98 eccentric of the axis 97 of the axle, as shown in FIG. 10, the center of the head being denoted at 99. Rotational adjustment of the axle 91, therefore, will change the inclination to a vertical plane of the plate 60, thereby varying the inclination of the working surface 70 to the working surface 40.

What happens when axle 91 is rotatably adjusted is illustrated somewhat exaggeratedly by comparison of FIGS. 8 and 9. FIG. 8 shows the parts in their zero positions. FIG. 9 shows axle 91 at its maximum adjustment. As will be obvious the adjustment tilts plate 60 and its working surface 70 with reference to plate 30 and its working surface 40.

Figure 7:
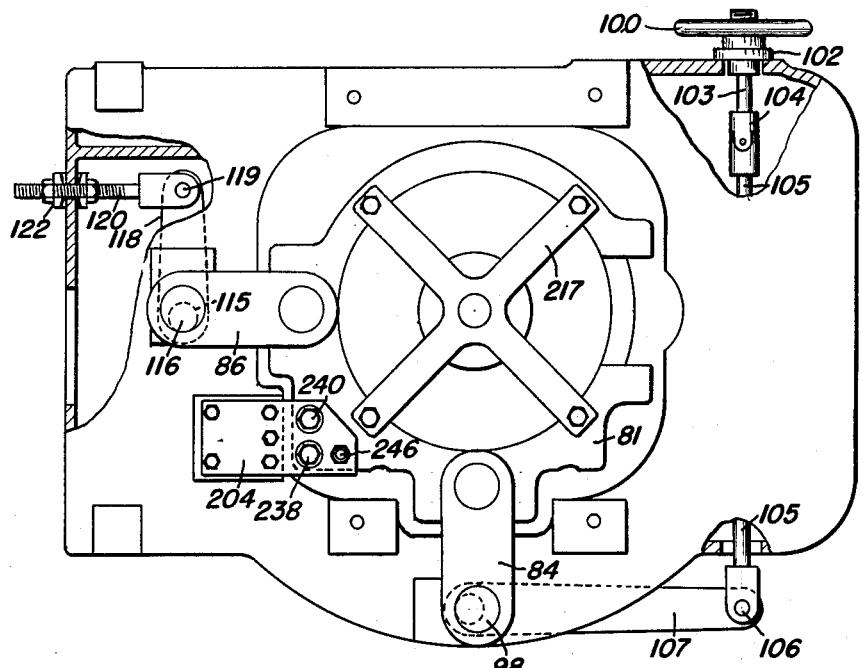
FIG. 7 is a rear view of the floating housing and its mounting, parts being broken away for the purposes of illustration.

Adjustment of the eccentricity of the axle 91 is effected by rotation of a hand wheel 100 (FIGS. 3 and 7) which is connected to a nut 102 that engages a screw threaded shaft 103 (FIG. 7). Shaft 103 is connected by a gimbal joint connection 104 with a shaft 105 that is pivotally connected at its lower end by means of pin 106 with a lever arm 107 that is keyed by means of key 108 (FIGS. 4 and 8) to the eccentric axle 91. A set-screw 109 serves to hold the key 108 in engaging position with reference to the axle 91.

The links 87 and 88 are mounted at opposite ends on axles in a manner similar to the mounting of the link 85, one axle in the case of the links 87 and 88 being journaled in the floating housing 81 and the other axle being journaled in the frame 82. The link 86 is mounted in a manner similar to the mounting of the link 84. At its inner end it is mounted on an axle journaled in the floating housing 81. At its outer end it is journaled on a stud, which has an eccentric head 115 (FIG. 7) similar to the head of the eccentric axle 90. The axle 116 is rotated by means of a lever 118, which is connected by means of a pivot pin 119 with a shaft 120, which is threaded and is held in adjusted position by nuts 122. By axial adjustment of shaft 120, eccentric head 115 can be rotated to shift the position of link 86, thereby to vary the tilt of the plate 60 in a horizontal plane.

The casing 57 is secured by means of Z brackets 110 (FIGS. 6 and 4) to the frame 82. The Z brackets are bolted to the frame by means of bolts 111 and are bolted to the casing 57 by means of bolts 112.

The working area is enclosed by the casings 50 and 57 (FIGS. 1, 2, 4 and 12) during the operation of the machine, but for inspection and replacement of the working plates, the frame 82 and all of the parts suspended therefrom may be swung away from the frame 21, as indicated fragmentarily in dotted lines in FIG. 2. For this purpose the frames are hinged together by means of a hinge pin or pintle 125. The pintle 125 is secured by split-clamp members 126 adjacent its upper and lower ends respectively, to the frame 21; and it is secured intermediate its ends by means of split clamp members 128 to the frame 82. It is adjustably mounted on the base 20 of the machine, being seated in a foot-piece or socket member 123 that is threadable through the nut 124 (FIG. 6) which is bolted to the base 20 of the machine. This adjustment permits offsetting the axis of the floating plate 60 vertically relative to the axis of the driving plate 30. Bolts 127 and 129, respectively, secure the split clamp members 126 and 128, respectively, to the housing 21 and 82, respectively.

The stock is fed to the machine into a hopper 130 (FIG. 4). From the hopper 130 it is fed to the working area by means of a screw shaft 131 which is mounted to rotate within a tubular extension 132 of the hopper 130. This tubular extension 132 is coaxial with the sleeve 26 and is mounted within a stationary tubular member 134 that is secured to the frame 21 and is mounted within the bore of the sleeve 26. The feed screw 131 is supported at its front end, by means of a bushing 135 (FIG. 5) and a bearing sleeve 136 from a plunger 138. This plunger is mounted in a recess in the front end of a tube 140, being secured therein by a set-screw 141 which engages in a peripheral recess 142 in the plunger. The tube 140 is formed at its rear end with a head 143 (FIG. 4) which is secured by means of bolts 144 to a bracket 145 that is secured by means of bolts 146 to the housing 21. The tube 140 carries a conventional anti-friction bearing 148 on which is journaled a cup-shaped member 149 that is secured at its inner end by means of bolts 150 and nuts 151 to a rotary member 155 and to a plate 157 which is welded to the feed screw 131. The rotary member 155 is provided around its periphery with angularly-spaced vanes 156. It cooperates with a stationary internally-vaned member 158 to prevent stock entering the hopper 130 from being pressed rearwardly. The cooperating vaned members scissor the stock inward as the vaned member 155 rotates with the feed screw 131. The internally-vaned member 158 is supported from the bracket 145, being secured thereto by bolts 159.

The rod 140 is provided with an axially extending duct 160 (FIG. 4): and the plunger 138 is provided with an axially aligned, axially-extending duct 161 (FIG. 5). The latter duct communicates at its inner end with a diagonally disposed duct 162 which opens into the space at the center between the two working surfaces of the machine. Steam may be admitted into the outer end of the duct 160 to supply steam to the pulp when the pulp requires heating in order to be properly processed.

The feed screw is driven by a sprocket 165 (FIG. 4) which is fastened to a flange on the cup-shaped member 149 by bolts 166. The sprocket may be driven from a sprocket 167 that is connected by means of conventional magnetic clutch 168 with the shaft 169. Shaft 169 is adapted to be driven from a countershaft 172 through a conventional gear reducer 170, and a sprocket and chain drive, denoted as a whole at 171.

Countershaft 172 is driven through a pulley 175, a belt 174, and a pulley 175. Pulley 175 is secured to a collar 176 by means of bolts 178. The collar 176 is secured to the sleeve 26 by bolts 179. Sleeve 26 is driven by pulley 32 from a motor (not shown) through V-belts 177.

There is a duct 182 in tubular member 134 which communicates with the annular space 183 formed between the stationary member 134 and the rotating sleeve 26. Cooling water can be pumped through this duct 182 into the space 183 to cool the bearings 25. A sealing member 180 is mounted in the bore of the collar 176 to surround the tubular member 134 and prevent leakage of the coolant rearwardly along member 134.

A ring-shaped member 185 (FIG. 5) is secured in the front end of the stationary member 134 by means of screws 186. It is provided on its periphery with a right-hand screw thread 187. A ring 188 is fastened by means of screws 189 to the front end of the sleeve 26. The member 188 is provided on its inner face with left-hand screw threads 190 which oppose the right-hand screw threads 187 of the ring 185. The ring 188 rotates, of course, with the sleeve 26. The opposed cooperating threads 187, 190 prevent pulp fibers from feeding back into the space 183 between the sleeve 26 and the stationary member 134. The water for cooling the bearings 25 also helps prevent pulp fibers from feeding back into the space 183, for the space 183 communicates at its front with the space between the threads 187 and 190, and the water flowing from sapce 183 flushes out the stock from between the threads. This water flows into the stock in the working area. The water is also conducted by the tube 192 and duct 193 into the casings 50, 57 to help flush treated stock away from the machine.

A controlled load is applied to the pulp, during rolling traverse thereof between the working surfaces, by means of a hydraulically actuated piston 200 (FIGS. 4 and 13) communicating through self-aligning thrust mechanism with the floating housing 81. The piston 200 reciprocates in a cylinder 201 which is secured by means of bolts 202 to a bracket 204 which is secured by means of bolts 205 to the frame 82. The piston is fastened to a piston rod 206 which is formed with a cup-shaped recess 207 in its inner end in which is mounted a race 208 for a ball 209. Ball 209 is also engaged in a cup-shaped recess in the rear end of a thrust rod 210. A cup-shaped recess in the front end of this thrust rod holds another ball 211 which seats against a race 212. Race 212 seats against a thrust disc 213 which engages the end plate 214. This end plate is secured by means of bolts 215 to the front end of the bracket 216 which has four radiating arms 217 that are fastened by means of bolts 218 to the floating housing 81.

Mounted on the inner end of the end plate 214 is a spool 220 which carries a limit switch 221. This limit switch is connected to operate the magnetic clutch 168 (FIG. 4) in the drive to the feed screw 131. It is adapted to be actuated by a plunger 223 which is slidably mounted in bearings 224 in member 225 (FIG. 5) that is secured by means of bolts 226 to a plate 227. Plate 227 is fastened by means of bolts 228 centrally in the front end of the sleeve 76.

Between the plate 227 and the member 225 there is clamped a flexible diaphragm 229 which is supported by the forward convex face of the head 233 of plunger 223. A helical coil spring 230 is interposed between this head 233 and the confronting surface of member 225. This spring constantly urges the plunger 223 away from switch 221. If the head 233 is forced far enough rearwardly, however, by pressure of the pulp between the feed screw 131 and the diaphragm 229, the plunger 223 will trip the switch 221 to stop the drive to the feed screw, thus preventing further feed of the pulp into the working area until the pressure of the pulp already in the working area is relieved. Then the spring 230 will disengage the plunger 223 from the switch 221; and the feed of the pulp to the working area will start again. This mechanism operates as a safety mechanism to protect the machine against plugging of pulp in the feeding zone in case more pulp is being fed than the working surfaces can traverse.

The front end of the cylinder 201 (FIG. 13) is closed by an end plate 232 that is fastened by means of bolts 234 to the cylinder. The head 207 of the piston rod 208 projects through a centrally disposed opening in this end plate. A seal 235 surrounds the head 208 to prevent entry of dirt or water into the oil in the cylinder. The motive fluid is supplied to and exhausted from the rear end of the piston 200 through a duct 236 in the rear end of the cylinder 201. A valve (not shown) in the piping, which is connected to duct 236, determines the direction of flow of the motive fluid in this duct.

A spring 237 (FIG. 2) quickly opens up the space between the working surfaces when the motive fluid is exhausted from the cylinder 201. This spring 237 is mounted on a rod 238 and is engaged between the head of that rod and floating housing 81. The rod 238 extends through an opening in the floating housing 81, and is adjustably anchored in the bracket 204 by nuts 239.

Figure 14:
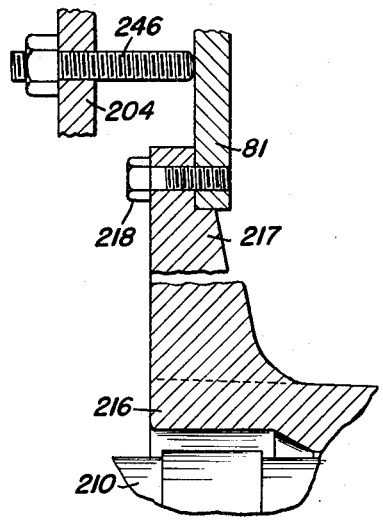
FIG. 14 is a fragmentary view showing the means for limiting the separation of the driven plate from the driving plate when the plates are moved apart to purge foreign material from between them.

There is sufficient space provided between the rear face of the paddles or flingers 74 (FIG. 5) and the rib 58 (FIG. 4) of the casing 57 to permit the retracting movement of the plate 60. The amount of this movement is limited by the adjustable stopscrew 246 (FIG. 14) which threads into the bracket 204 and which is positioned to engage the floating housing 81. In the retractive movement, the enlarged portion 241 of the piston-rod enters the recess 243 in the outer end wall of the cylinder 201 so that the end of the retractive movement is dash-potted and cushioned.

The piston rod 206 slides in a conventional sealing member 250; and there is a split clamp member 252 clampable about the rear end of the piston rod 206 and held in clamped position by a conventional screw 253. This split clamp member is adapted to abut against the outer end of sealing member 250 to limit the forward movement of floating plate 60. It is adjustable on piston rod 206 and controls the minimum clearance between the working surfaces 70 and 40. Of course, sufficient clearance will always be provided to prevent any possibility of contact between the working surfaces. Clamp member 252 engages the lower end of a lever 255 which is pivoted by means of the pin 256 in a sleeve 257 that is secured by means of screws 258 to the seal 250. The indicator lever 255 is adapted to read against a graduated scale 260 mounted upon the sleeve 257. A coil spring 262 is interposed between the bottom end of the lever and the rear end wall of the cylinder 201, being mounted in a recess in the lower end of the lever and in a recess in the sealing member 250. The scale 260 is graduated to indicate the amount of float of the piston.

To aid in assembly and maintenance of the machine, a stop is provided in the form of a bolt 240 (FIG. 2). This is threaded into the floating housing 81 and extends through an opening in bracket 204 and carries stop nuts 242 and 244. This stop does not function during operation of the machine, stop member 252 being relied upon to govern minimum clearance between the plates 60 and 30.

The port 237' (FIG. 13) in the front end plate 230 of the cylinder 201 permits any liquid which may leak past the piston 200 to return to the oil reservoir or sump.

Figure 11:
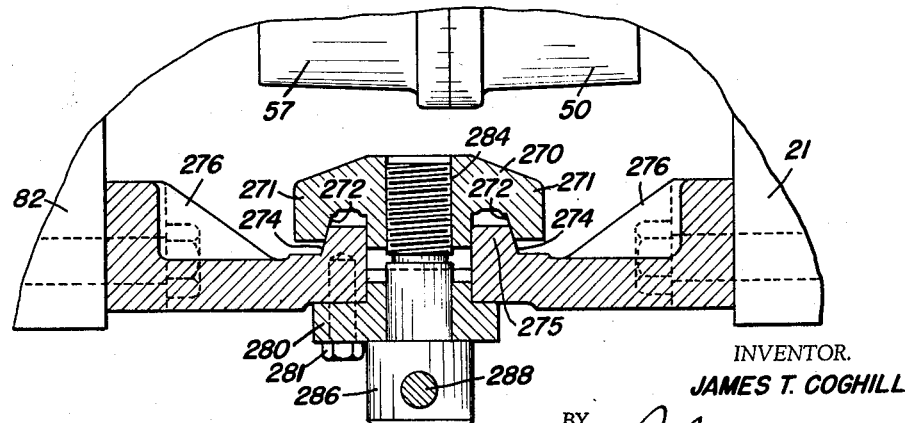
FIG. 11 is a fragmentary section on an enlarged scale taken on the line 11—11 of FIG. 1, looking in the direction of the arrows, and showing the means for locking the frames together to enclose the working area of the machine during operation.
Figure 3:
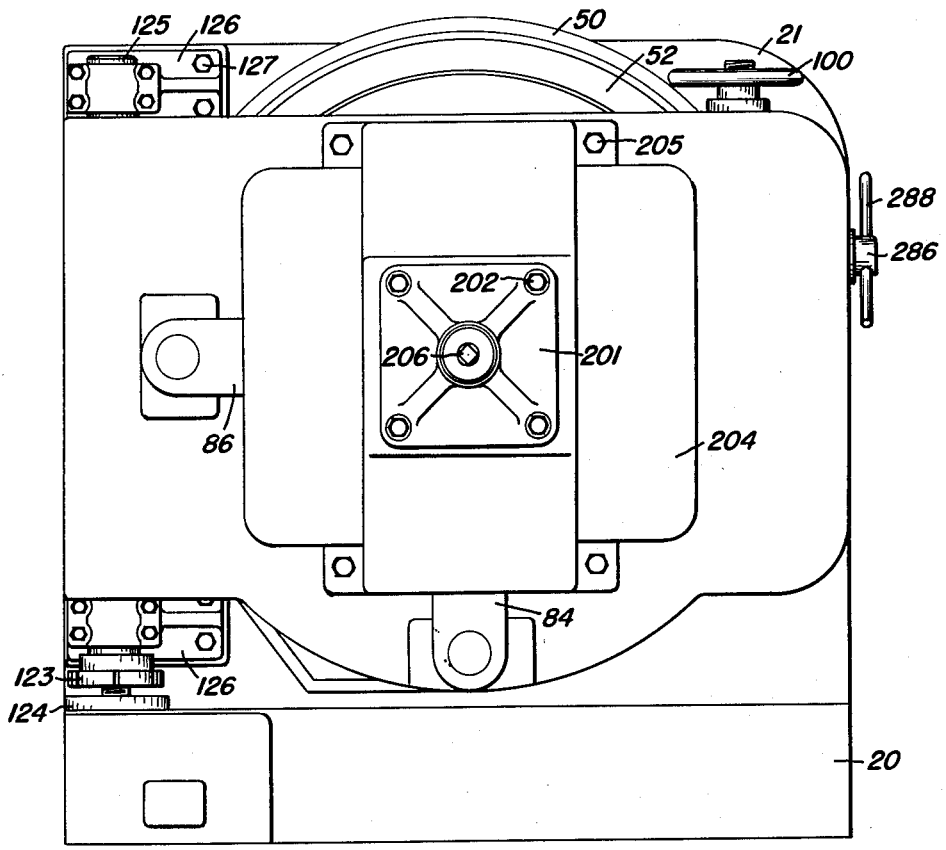
FIG. 3 is an end view of this machine, looking at one end of the machine.

The working surfaces are held in operative position by a locking member 270 (FIGS. 2 and 11) in the form of a yoke having straight parallel side portions 271 which have opposed inclined inside surfaces 272. The surfaces 272 are adapted to engage the inclined faces 274 formed on the parallel straight portions 275 of the arms of two lock brackets 276 that are bolted by means of bolts 278 to the frame 21 and the frame 82, respectively. The lock yoke 270 engages at one side of the lock brackets. A lock plate 280 is engaged at the opposite side of these lock brackets. This lock plate is secured to one of the lock brackets 276 by screws 281. The yoke and the plate have portions which project between the lock brackets as shown in FIG. 2; and there is a bolt 284 that passes through the plate 280 and threads into the yoke 270 to tighten up the lock when the head 286 of the bolt, which may be manipulated by the lever 288, is rotated. The straight side portions 271 of the yoke member and the corresponding mating straight portions 275 of the arms 276 permit functioning of the lock despite vertical adjustment of the frame 82 to offset the axis of the floating plate 60 vertically relative to the axis of the driving plate 30.

In the use of the machine, the plate 60 is adjusted tiltably in the vertical and horizontal planes by adjustment of link member 84 (FIGS. 7 and 9) and of link member 86 (FIG. 7), respectively, in accordance with the desired speed of the floating plate relative to the driven plate. The hinge pin or pintle 125 is also adjusted vertically by rotary adjustment of foot-piece or socket 123 in nut 124 (FIG. 6), in order to provide the desired offset of the axis 61 (FIG. 16) of the plate 60 with reference to the axis 62 of the plate 30.

When the machine is started, a motor (not shown) drives the plate 30. When the plate 30 is rotating at the proper speed, a switch (not shown) may be closed to engage the magnetic clutch 168. This causes the feed screw 131 to feed the stock into the center of the space between the working surfaces 40 and 70. As the plate 30 revolves, the toothed plates 40 carried thereby, acting through the stock between the plates, drive the toothed plates 70 and the plate 60 which carries them. The plate 60 and the plates 70 carried thereby are pressed toward the plates 40 by hydraulic pressure applied to the piston 200.

Since the axis 61 of the plate 60 is offset from the axis 62 of the plate 30, the stock will be rolled traversingly between and over the plates, every point of one plate travelling in a circle relative to the other plate, whose radius is equal to the offset of the axes of the two plates when the two plates 60 and 30 are rotating at the same speed. If they are rotating at different speeds, points in one plate will travel in cycloidal curves relative to the other plate.

In practice the velocity of the two plates at their peripheries may be 6000 ft. per minute; but the adjustment for eccentricity is made so that the relative speed of one plate in relation to the other will be in the order of 200 ft. per minute so that the proper rollwise traverse of the pulp over the plates will be attained. It is obvious that in a machine of the type herein described, control of the relative rotational speed of the two plates is essential since the curling process depends upon low relative speed between the working surfaces.

As the plates revolve, the stock is rolled outwardly toward the edges of the plates being urged outwardly by centrifugal force and the directional construction of the plates 40 and 70 themselves. The speed of the floating plate in relation to the driven plate will be determined by the tilt of the plate 60 relative to the plate 30. If the plate 60 is tilted so that the clearance, and therefore the pressure, at A (FIGS. 4, 5 and 16) is less than at the diametrically opposite point B, the plate 60 will run faster than the plate 30. If the plate 60 is tilted so that the clearance at A is greater than at the point B, the plate 60 will run slower. Points A and B are on the line passing through the centers of both plates. In the instance illustrated in the drawings the axis 62 of plate 30 is offset in a vertical plane from the axis 61 of plate 60, and points A and B are on the vertical center line of the axes.

Tilting in the vertical plane as just described controls the speed of the floating plate 60 relative to the driving plate 30. The tilting adjustment in the horizontal plane is for the purpose of achieving parallelism of the axes of the plates in a horizontal plane.

Figure 12:
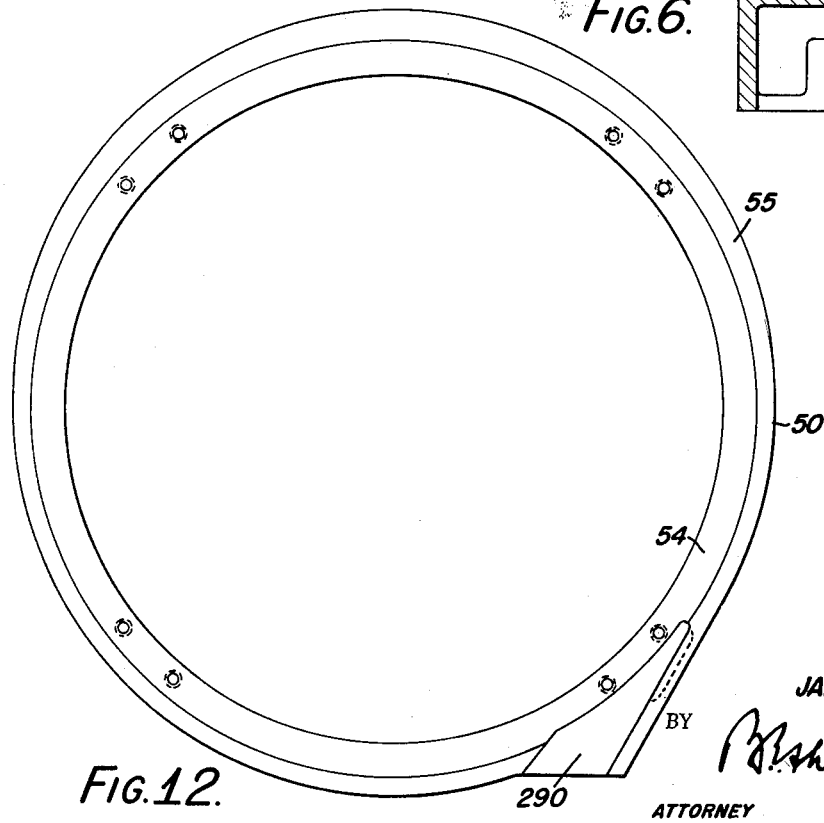
FIG. 12 is an elevation of one of the casings which enclose the working area of the machine.

The casings 50 and 57 have discharge ports in them, such as denoted at 290 in FIG. 12, through which the pulp delivered at the peripheries of the plates may be discharged from the machine. As the plates 30 and 60 revolve, the paddles or flingers 42 and 74 (FIG. 4) sweep the pulp into and through these ports.

The machine of this invention has several outstanding advantages. By rotating both plates a simple construction is attained with many fewer parts and much less weight than with machine of the same capacity heretofore built. At the same time the desired slow speed orbital or gyratory motion of one plate relative to the other is attained. The present machine, moreover, has the advantage that it can feed and curl readily high-density pulp, because the two plates are rotating. The present machine will take chips, also and, therefore, is economical to use in the semi-chemical field. The centrifugal force is an important aid in starting the curling operation and helps the feed of the pulp over and between the plates. By tilting one plate relative to the other it is possible to control the relative speeds of the two plates; and this also is an important factor in control of the process.

Because of the manner in which the casings are suspended by use of Z brackets, each casing can expand in all directions when hot stock comes into a cold machine. The same thing is true when the machine is washed with icy water. The Z-brackets are clamped with initial stress. The Z-brackets suspend the casings in such a way as to take care of expansion and contraction and prevent warpage.

Another feature of the present machine is the convenience of opening the machine for inspection and change of the working surfaces. All that is required is to unlock the frames from one another, and to swing the frame, which carries the floating housing, away from the frame which carries the driving plate.

A prime feature of the machine is the control of speed of rotation of the floating plate which is achieved through the tilting adjustment. It an attempt is made to drive two plates, whose axes are offset from one another, positively at the same speed, or at a predetermined precise difference in speeds, it is necessary to employ a drive capable of carrying many times the required horsepower. The great horsepower capacity of the drives is required because of the strain exerted to keep the plates running at the desired speed despite inaccuracies in the drive and in the parallelism of the plates. By tilting one plate relative to the other as is done in the present machine, only on of the plates need be driven, yet precise control can be had over the relative speeds of the plates.

The basic principles of the present machine may be applied in fields other than the field of processing papermaking pulp. Thus, the invention may be employed also in machines for crushing coal, or ore, or asbestos, or for mixing paint or vinyl plastics, or for compounding rubber, or for the production of colloidal substances of all descriptions, wherever it is desirable to utilize a slow speed rolling and kneading motion.

For paper pulp, surfaces are employed having protuberances, but for other materials other types of surfaces, including even smooth surfaces, may be used, provided the friction characteristics between the surfaces and the material are sufficient to support the rolling motion.

While the invention has been described in connection with a special embodiment thereof, then, it is capable of further modification, and this application is intended to cover any variations, uses, or adaptations of the invention following, in general, the principles of the invention, and including such departures from the present disclosure as come within known or customary practice in the art to which the invention pertains, and as may be applied to the essential features hereinbefore set forth, and as fall

Having thus described my invention, what I claim is:

1. A machine for processing papermaking pulp comprising a pair of rotary working plates having opposed working surfaces disposed to form between them a thin working space and which have tiny, spaced protuberances formed thereon and projecting into the working space to provide traction for nodules of pulp without obstructing rolling traverse of the nodules on the working surfaces, means supporting said plates for rotation respectively about axes offset from one another, one of said plates being mounted floatingly to move toward and from the other plate, means for constantly urging said floating plate toward the other to apply pressure to the pulp engaged between the plates, means for positively rotating one of said plates to drive the other plate solely through the pulp engaged between the plates, and means for adjustably varying the relative speeds of rotation of the two plates.

2. A machine of the character described for processing a work material comprising a pair of rotary working plates having opposed working surfaces disposed to form between them a thin working space, means for supporting said plates for rotation about axes offset, respectively, from one another, means for constantly urging one of said plates toward the other to apply pressure to work material engaged between the plates, means for rotating one of said plates to drive the other plate solely through the work material engaged between the plates, means constantly urging said other plate toward said one plate under a regulatable pressure, means mounting said other plate so that it is free to float toward and away from said one plate responsive to the balance of forces between said material and said pressure, and means for mounting one of said plates for tiltable adjustment relative to the other plate to control the relative rotational speeds of the two plates.

3. A machine for processing papermaking pulp comprising a pair of rotary working plates having opposed working surfaces disposed to form between them a thin working space and which are roughened to provide traction for nodules of pulp without obstructing rolling traverse of the nodules on the working surfaces, means for pressing one plate toward the other to compress the pulp between the opposed working surfaces, means for rotating one of said plates to drive the other plate through the pulp engaged between the plates, a support on which one of said plates is rotatably mounted, a frame, and means for suspending said support from said frame comprising a pair of links, each of which is mounted at one end by a universal joint connection on said support and each of which is mounted at its opposite end by a universal joint connection on said frame, one of said universal joint connections comprising a stud rotatable in said frame and having a ball head, and a mating hollow spherical portion on said link engaging said head, the axis of said head being offset from but parallel to the axis of said stud, and said stud being rotatably adjustable to effect tilting adjustment of said support on the frame to control the relative speed of rotation of said plates.

4. A machine for processing papermaking pulp comprising a pair of rotary working plates having opposed working surfaces disposed to form between them a thin working space and which are roughened to provide traction for nodules of pulp without obstructing rolling traverse of the nodules on the working surfaces, means for pressing one plate toward the other to compress the pulp between the opposed working surfaces, means for rotating one of said plates to drive the other plate through the pulp engaged between the plates, a support on which one of said plates is rotatably mounted, a frame, and means for suspending said support from said frame comprising two pairs of links, the links of one pair being disposed at right angles to the links of the other pair, each of said links being mounted at one end by a universal joint connection on said support and each of said links being mounted at its opposite end by a universal joint connection on said frame, one of the universal joint connections for one link of each pair of links comprising a stud rotatable in the frame, and having a ball head, and a mating hollow spherical portion on said link engaging such head, the axis of each such head being offset from but parallel to the axis of the associated stud, and each such head being adjustable on its stud to effect tilting adjustment of said support on the frame, one of said tilting adjustments being about a vertical axis and the other of said tilting adjustments being about a horizontal axis, and said tilting adjustments serving to control the relative speeds of rotation of the two plates.

5. A machine for processing papermaking pulp comprising a paper of working plates having opposed working surfaces, a pair of supports for supporting the two plates for rotation about relatively offset axes at least one of which is horizontal, means for driving one of said plates, at least, to impart rotation thereto, and means for hingedly connecting one of said supports to the other for hinging movement about a vertical axis, to move said plates away from one another out of operative position to permit access to the plates by swinging one of said supports away from the other about said vertical axis, said supports when in operative relation to one another disposing said plates so that they have a thin working space between them for the pulp to be processed.

6. A machine for processing papermaking pulp comprising a pair of supports, a working plate rotatably mounted on each support, said working plates having opposed working surfaces disposed to form between them a thin working space and roughened to provide traction for nodules of pulp without obstructing rolling traverse of the nodules on the working surfaces, one of said plates at least being mounted in its support for rotation about a horizontal axis, a hinge pin for hingedly connecting one of said supports to the other for pivotal movement about a vertical axis, means for fixedly securing one of said supports to said hinge pin, means for adjusting one of said supports vertically along the axis of said hinge pin to offset the axis of the plate mounted on said one support relative to the axis of the other plate, and means for effecting rotation of the two plates.

7. A machine for processing papermaking pulp comprising two working plates having opposed working surfaces which are disposed to form between them a thin working space and which have tiny, spaced protuberances formed thereon and projecting into the working space to provide traction for nodules of pulp without obstructing rolling traverse of the nodules on the working surfaces, a support on which one of said plates is rotatably mounted, said one plate having a central opening therein communicating with the working space, a port in said support through which pulp to be treated may be supplied to the machine, a feed screw journaled in said support coaxially of said one plate for feeding pulp from said port through said central opening into the working space, means for rotating said feed screw independently of said plates, and means for rotating said one plate, said feed screw having a duct therethrough through which a fluid may be conducted into said working space to treat pulp therein.

8. A machine for processing papermaking pulp comprising a support, a first plate rotatably mounted in said support, a casing surrounding said plate and suspended from said support by a plurality of Z-plates which are angularly-spaced about the axis of said plates, a second plate, said first and second plates having opposed working surfaces disposed to form between them a thin working space and which are roughened to provide traction for nodules of pulp without obstructing rolling traverse of the nodules on the working surfaces, a second casing surrounding the second plate and adapted to abut against the first-named casing to cooperate therewith to surround said plates and said working space, a second support, a plurality of Z-plates for suspending said second casing from said second support, said Z-plates being angularly spaced about said second plate, and means for connecting one support hingedly to the other for pivotal movement relative thereto about a vertical axis, whereby access may be had to the plates by swinging one of the supports away from the other about said vertical axis.

9. A machine for processing papermaking pulp according to claim 8 in which said second plate is rotatably mounted on said second support and the hinge means is adjustable vertically to offset the axis of said second plate from the axis of said first plate.

10. A machine for processing papermaking pulp according to claim 9 in which there is a housing mounted in said second support for tilting adjustment therein to incline said second plate to said first plate, and in which said second plate is journaled on said housing, thereby being mounted on said second support.

11. A machine for processing papermaking pulp according to claim 10 having a cylinder secured to said second support, a piston reciprocable in said cylinder and secured to said housing, means for applying fluid pressure to one side of said piston to press said second plate toward said first plate to compress pulp between said plates, and spring means for pressing against said housing to move said second plate away from said first plate upon relief of the fluid-pressure.

12. A machine of the character described for processing a work material, comprising a pair of rotary working plates having opposed surfaces disposed to form between them a working space, an upright on which one of said plates is rotatably mounted, a frame, a housing, means rotatably supporting the other plate on said housing, means for suspending said housing from said frame for tilting adjustment to incline the axis of said other plate to the axis of said one plate, means for moving said housing on said frame to move said other plate toward and from said one plate, means constantly urging said housing in a direction to constantly urge said other plate toward said one plate to apply pressure to the work material engaged between said plates, means for adjusting said housing on said frame in a direction perpendicular to the axis of said one plate to offset the axes of the two plates relative to one another, and means for rotating one of said plates to drive the other plate through the work material engaged between the plates.

13. A machine of the character described for processing a work material, comprising a base, an upright mounted on said base, a first working plate rotatably mounted on said upright, a frame, a housing tiltably suspended from said frame, a second working plate rotatably mounted on said housing, said second plate being disposed in opposed relation to said first plate so that said plates form a working space between them, means constantly urging said second plate toward said one plate to apply pressure to the work material engaged between said plates, means for adjusting one of said plates to offset its axis relative to the axis of the other plate, and means for rotating one of said plates to drive the other plate through the work material engaged between the plates, said frame being hingedly mounted on said upright to swing said second plate away from said first plate to permit access to the plates.

14. A machine of the character described for processing a work material, comprising a base, an upright mounted on said base, a first working plate rotatably mounted on said upright for rotation about a horizontal axis, a frame, a housing, a second working plate rotatably mounted on said housing for rotation, said second plate being disposed in opposed relation to said first plate so that said plates form a working space between them, means for driving one of said plates to drive the other plate through the work material engaged between the plates, means for tiltably adjusting said housing in said frame to incline the axis of said second working plate in a vertical plane relative to the axis of said first working plate thereby to adjust the relative speeds of said plates, means constantly urging said housing toward said one plate to apply pressure to the work material engaged between the plates, and means for adjusting one of the plates relative to the other vertically to offset their axes from one another.

15. A machine of the character described as claimed in claim 14 in which said frame is hingedly connected to said upright to swing about a vertical axis to permit said second plate to be swung away from said first plate for access to the plates.

16. A machine of the character described as claimed in claim 15 in which said frame is adjustable vertically along its hinge axis to effect offset of the axes of the plates relative to one another.

References Cited in the file of this patent

UNITED STATES PATENTS

| | | |
|---|---|---|
| 1,058,114 | Symons | Apr. 8, 1913 |
| 1,719,784 | Ross | July 2, 1929 |
| 2,083,462 | Long et al. | June 8, 1937 |
| 2,516,384 | Hill et al. | July 25, 1950 |
| 2,589,307 | Symons | Mar. 18, 1952 |
| 2,646,728 | Coghill et al. | July 28, 1953 |
| 2,674,928 | Coghill | Apr. 13, 1954 |
| 2,718,821 | Cumpston | Sept. 27, 1955 |
| 2,876,958 | Edwards et al. | Mar. 10, 1959 |

UNITED STATES PATENT OFFICE
CERTIFICATE OF CORRECTION

Patent No. 3,028,632                      April 10, 1962

James T. Coghill

It is hereby certified that error appears in the above numbered patent requiring correction and that the said Letters Patent should read as corrected below.

In the grant, line 3, and in the heading to the printed specification, lines 5 and 6, for "a corporation of Delaware", each occurrence, read -- a corporation of New York --.

Signed and sealed this 4th day of September 1962.

SEAL)
Attest:

ERNEST W. SWIDER
Attesting Officer

DAVID L. LADD
Commissioner of Patents